(12) United States Patent
Heo et al.

(10) Patent No.: US 7,764,661 B2
(45) Date of Patent: Jul. 27, 2010

(54) METHOD AND APPARATUS FOR CHANGING TTI BASED ON A HARQ PROCESS IN AN ENHANCED UPLINK DEDICATED CHANNEL

(75) Inventors: Youn-Hyoung Heo, Suwon-si (KR); Joon-Young Cho, Suwon-si (KR); Ju-Ho Lee, Suwon-si (KR); Yun-Ok Cho, Suwon-si (KR); Young-Bum Kim, Seoul (KR); Yong-Jun Kwak, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1230 days.

(21) Appl. No.: 11/121,004

(22) Filed: May 4, 2005

(65) Prior Publication Data

US 2005/0249120 A1 Nov. 10, 2005

(30) Foreign Application Priority Data

May 4, 2004 (KR) ...................... 10-2004-0031460
Aug. 6, 2004 (KR) ...................... 10-2004-0061939

(51) Int. Cl.
*H04B 7/216* (2006.01)
(52) U.S. Cl. ........................ 370/342; 370/235; 370/236; 370/252; 370/338; 370/349; 370/320; 370/335; 370/441; 370/479; 714/18; 714/748; 714/749; 714/750; 455/69
(58) Field of Classification Search ................. 370/236, 370/235, 320, 335, 342, 395.4, 395.41, 395.42, 370/395.43, 441; 714/18, 748–750; 455/231, 455/255, 313
See application file for complete search history.

(56) References Cited

U.S. PATENT DOCUMENTS

| 5,230,071 A | * | 7/1993 | Newman | ...................... | 710/60 |
| 7,564,867 B2 | * | 7/2009 | Cheng et al. | ................ | 370/464 |
| 2002/0122400 A1 | | 9/2002 | Vayanos et al. | | |

(Continued)

FOREIGN PATENT DOCUMENTS

EP 1 286 491 A1 2/2003

(Continued)

OTHER PUBLICATIONS

E-DCH physical layer structure—TTI vs HARQ structure; Nokia; pp. 17-19, Jan. 2002.

(Continued)

*Primary Examiner*—Aung S Moe
*Assistant Examiner*—Hoon J Chung
(74) *Attorney, Agent, or Firm*—Roylance, Abrams, Berdo & Goodman, L.L.P.

(57) ABSTRACT

A method and apparatus for changing a Transmit Time Interval (TTI) based on a Hybrid Automatic Repeat Request (HARQ) process in a code division multiple access (CDMA) communication system that supports a packet data service through an Enhanced Uplink Dedicated transport Channel (E-DCH). According to the method and apparatus, a data transmission/reception is performed in a manner that a TTI change signal is received, the actual time point of TTI change is calculated based on the TTI change signal and the HARQ process of the previous TTI, and the TTI is changed at the calculated time point of TTI change.

16 Claims, 15 Drawing Sheets

U.S. PATENT DOCUMENTS

| | | | |
|---|---|---|---|
| 2002/0191544 A1* | 12/2002 | Cheng et al. | 370/236 |
| 2003/0147348 A1* | 8/2003 | Jiang | 370/229 |
| 2003/0153276 A1* | 8/2003 | Terry et al. | 455/69 |
| 2003/0210669 A1* | 11/2003 | Vayanos et al. | 370/335 |
| 2004/0037224 A1* | 2/2004 | Choi et al. | 370/235 |
| 2004/0228315 A1* | 11/2004 | Malkamaki | 370/342 |
| 2007/0079207 A1* | 4/2007 | Seidel et al. | 714/748 |

FOREIGN PATENT DOCUMENTS

| | | |
|---|---|---|
| EP | 1 389 848 A1 | 2/2004 |
| JP | 2003-229813 | 8/2003 |
| JP | 2003-283596 | 10/2003 |
| KR | 1020030052050 | 6/2003 |
| KR | 1020030055628 | 7/2003 |
| KR | 1020040044424 | 5/2004 |
| WO | WO 03/104919 A2 | 12/2003 |

OTHER PUBLICATIONS

HARQ Simulations Comparing 2ms and 10ms TTI; Qualcomm; pp. 1-10, Oct. 2003.

3rd Generation Partnership Project; Technical Specification Group Radio Access Network; Feasibility Study for Enhanced Uplink for UTRA FDD; pp. 1-13, Mar. 2004.

* cited by examiner

METHOD AND APPARATUS FOR CHANGING TTI BASED ON A HARQ PROCESS IN AN ENHANCED UPLINK DEDICATED CHANNEL

This application claims the benefit under 35 U.S.C. 119(a) priorities to applications entitled "Method and Apparatus for Changing TTI in Consideration of HARQ Process in Enhanced Uplink Dedicated Channel" filed in the Korean Industrial Property Office on May 4, 2004 and assigned Serial No. 2004-31460 and on Aug. 6, 2004 and assigned Serial No. 2004-61939 respectively, the entire contents of which are hereby incorporated by reference.

BACKGROUND OF THE INVENTION

1. Field of the Invention

The present invention relates to a method and apparatus for changing a Transmit Time Interval (TTI) based on a Hybrid Automatic Repeat Request (HARQ) process in an asynchronous code division multiple access (CDMA) communication system in which an uplink packet transmission is performed. In particular, the present invention relates to a method and apparatus for changing the TTI based on the HARQ process in a CDMA communication system that supports an Enhanced Uplink Dedicated transport Channel (E-DCH).

2. Description of the Related Art

An Enhanced Uplink Dedicated transport Channel (E-DCH) system is a system provided for improving the performance of packet transmission through the introduction of a new technology in an uplink communication in an asynchronous code division multiple access (CDMA) communication system. In order to improve the transmission efficiency in the recently introduced E-DCH system, an adaptive modulation and coding (hereinafter referred to as an "AMC") system, an n-channel stop and wait HARQ (hereinafter referred to as an "n-channel SAW HARQ") system and a Transmit Time Interval (TTI) and Node B control scheduling method may be used.

FIG. 1 is a view illustrating the operation of E-DCH.

Referring to FIG. 1, the reference numeral '110' denotes a base station (hereinafter referred to as a "Node B") that supports the E-DCH, and '101 to 104' denote mobile terminals (hereinafter referred to as User Equipments (UE's)) for receiving/transmitting the E-DCH. Communication channels 111, 112, 113 and 114 provide a wireless link between the Node B 110 and the mobile terminals 101, 102, 103 and 104, respectively. The Node B 110 performs scheduling for each UE based on the channel environments of the UEs 101 to 104 that use the E-DCH. In order to improve the performance of the whole system, the Node B allocates a low data rate to UEs that are located far from the Node B, and allocates a high data rate to UEs that are near the Node B, without surpassing the wireless resource limit of the Node B.

Hereinafter, the basic transmitting/receiving procedure of the E-DCH will be explained with reference to FIG. 2. In FIG. 2, the reference numeral '202' denotes a UE for transmitting the E-DCH, and '201' denotes a Node B (i.e., a base station) to which the UE 102 belongs. The Node B 201 and the UE 202 perform an initial setting process for transmitting/receiving the E-DCH at step 203. This setting process comprises a process of transferring a message and so on through a dedicated transport channel. After the E-DCH setting is performed at step 203, the UE 202 informs the Node B 201 of scheduling information at step 204. The scheduling information at step 204 may be information about transmission power of the UE from which uplink channel information can be known, information about spare power that the UE can transmit, the amount of data stored on a buffer of the UE to be transmitted, etc. At step 204, the Node B 201 receives the scheduling information from the UE 202. Then, at step 211, the Node B 201 determines whether to perform scheduling of the E-DCH for the UE 202 based on the received scheduling information.

If the scheduling of the E-DCH for the UE 202 is determined, the Node B 201 generates scheduling allocation information for the UE 202. For reference, if a plurality of UEs belong to the Node B 201 and simultaneously request the E-DCH service, the Node B 201 should receive the scheduling information from the respective UEs. Additionally, the Node B may generate the scheduling allocation information for a specified UE based on the scheduling information received from the respective UEs. However, in the following description of the present invention, only one UE 202 will be considered for convenience. At step 205, the Node B 201 transmits the scheduling allocation information generated for the UE 202 to the UE 202. At that time, the scheduling allocation information comprises information about a data rate, transmission timing, and so on. The UE 202 that has received the scheduling allocation information at step 205 transmits the E-DCH using the scheduling allocation information at step 207, and simultaneously transmits a transport format resource indicator (hereinafter referred to as a "TFRI") of the transmitted E-DCH to the Node B 201 together with the E-DCH at step 206. The Node B 201 that has received the E-DCH determines whether any error occurs in the TFRI or E-DCH at step 213. If an error occurs in either the TFRI or the E-DCH, the Node B 201 transmits negative acknowledge (NACK) information to the UE 202, and if no error occurs in the TFRI and the E-DCH, it transmits acknowledge (ACK) information to the UE 202 through an ACK/NACK channel at step 208. At that time, the conventional downlink Dedicated Physical Data Channel (DPDCH), downlink Dedicated Physical Control Channel (DPCCH), and so on, may be used as the ACK/NACK channel. Also, the ACK/NACK channel may be time-multiplexed with other channels, or may be defined as a separate channel.

Hereinafter, the n-channel SAW HARQ system will be explained in detail.

N-channel SAW HARQ system is a general term for indicating a system that has recently introduced the two following schemes in order to improve the efficiency of the typical SAW ARQ system.

First, a receiving part reduces the probability of error occurrence by temporarily storing data having an error and combining the data with a retransmitted portion of the corresponding data. This process is called a soft combining. The soft combining comprises two techniques—a chase combining (CC) and an incremental redundancy (IR).

In the CC, a transmitting part uses the same transmission format when it initially transmits the data and when it retransmits the data. If it is assumed that m symbols that comprise one coded block are transmitted during the initial transmission of data, the same number of symbols are transmitted during the retransmission of data. That is, during the initial transmission and the retransmission of data, the same coding rate is applied. The receiving part combines the initially transmitted data block with the retransmitted data block, performs a CRC operation using the combined data block, and confirms if an error occurs.

In the IR, different transmission formats are used during the initial transmission and retransmission of data. If it is assumed that n-bit user data is converted into m symbols through the channel coding, the transmitting part transmits only a part of the m symbols during its initial transmission of data, and then sequentially transmits the remaining part during its retransmission of data. That is, the coding rate of the initial transmission of data is different from that of the retransmission of data. The receiving part constructs a data block having a high coding rate by attaching the data block transmitted during the retransmission of data to the tail of the initially transmitted data block, and then performs an error correction. In the IR, the initially transmitted data block and the retransmitted data block are differentiated from each other by their version numbers. The initial transmission, the next transmission and the subsequent transmission are called version 1, version 2 and version 3, respectively, and the transmitting part can properly combine the initially transmitted data block with the retransmitted data block using the version information.

In the n-channel SAW HARQ system, the second system introduced in order to improve the efficiency of the conventional SAW ARQ system is as follows. In the conventional SAW ARQ system, the next packet can be transmitted only after the ACK signal of the previous packet is received. In the n-channel SAW HARQ system, a plurality of packets are successively transmitted without receiving any ACK signal to improve the efficiency of the wireless link. In the n-channel SAW HARQ, if n logic channels are set between the UE and the receiving part and identifies the channels by a specified time or channel number, the receiving part can recognize which channel the packet received at a certain time point belongs to, and thus can independently perform the HARQ process such as the reconstruction of the packets in the order of their reception, the soft combining of the corresponding packet, and so on.

FIG. 3 is a view illustrating the HARQ operation to be applied in the E-DCH. Here, it is assumed that the number of channels is 4, and four independent HARQ processes can be performed. The UE transmits packet data in the unit of a TTI. If the UE transmits HARQ process #1 301, HARQ process #1 301 reaches the Node B 201 after a specified propagation time (Tprop) 302 elapses. The Node B 201 performs a demodulation of the received data after it receives the data as long as the corresponding TTI 303. If no error occurs as a result of demodulation, the Node B generates the ACK signal 304 while if an error occurs, it generates the NACK. The time required for the Node B to receive the data and generate the ACK/NACK signal corresponds to TNBP 305, which varies according to the size of data and the characteristic of the receiver. The ACK/NACK signal transmitted by the Node B reaches the UE after a propagation time (Tprop) 306 elapses. The UE can calculate which frame the ACK/NACK response of the corresponding channel reaches in consideration of the above-described time. In other words, if the data is transmitted through HARQ process #1 301, the UE 202 can recognize that the ACK/NACK information received after the time period of '2XTprop+TNBP' is the ACK/NACK signal for the HARQ process #1 301. However, the accurate time relation is determined by the above-described time and the maximum supportable number of HARQ channels. As illustrated in FIG. 3, the ACK/NACK signal of the HARQ process #1 is always transmitted to the frame of the time (TACK) 307. If the UE 202 receives the ACK signal for the HARQ process #1 at a determined time, it transmits a new packet for the next TTI that corresponds to the time 307, while if the UE 202 receives the NACK signal, it retransmits the data for the HARQ process #1 stored in the buffer using the above-described CC or IR method. Meanwhile, if the UE cannot receive the ACK or NACK signal from the designated frame, it determines that the packet transmission of the corresponding channel fails, and performs the retransmission process. The processing time of the UE taken for the initial transmission or retransmission of data after the ACK signal is received corresponds to TUEP 308 in FIG. 3.

The above-described HARQ operation is performed in the unit of a TTI, and for the E-DCH service, a short TTI for 2 ms and a long TTI for 10 ms have now been described.

In the case of using the long TTI, the existing R99 DPDCH structure can be used, but a delay is lengthened in comparison to the short TTI. In the case of using the short delay, the delay can be shortened, but a new physical layer channel is required because the TTI shorter than the existing DPCH is used and a separate signaling method is required for the existing Transport Format Combination Indicator. The simplest method that uses the short TTI is to add a new code channel, but this method has the drawback in that it increases a peak to average ratio. Since the short TTI and the long TTI have the respective advantages/drawbacks as described above, the use of the two TTIs according to the conditions for the E-DCH service would be able to increase the efficiency of the whole service. In the case in which the two TTIs are variably used according to the conditions of the UE or the Node B, the influence exerted on the HARQ should be considered.

As described above, the packet transmission according to the conventional method is performed in the unit of a TTI. Accordingly, if the corresponding TTI is changed, the data transmission/reception should be performed according to the changed TTI, and the HARQ operation that includes the corresponding ACK/NACK signal transmission/reception and the retransmission of the packet should be changed according to the changed TTI. That is, if the HARQ operation is not completed at the time point when the TTI is changed, the changed TTI becomes different from the TTI set at the initial transmission of the data. Accordingly, a need exists for a proper method for the TTI change in consideration of the HARQ operation is required.

SUMMARY OF THE INVENTION

Accordingly, the present invention has been designed to solve the above and other problems occurring in the prior art, and an object of the present invention is to provide a method and apparatus capable of enhancing the system performance that may deteriorate due to the change of a Transmit Time Interval (TTI) by minimizing the influence exerted on a Hybrid Automatic Repeat Request (HARQ) process being performed at a time point when the TTI is changed if it is intended to enhance the performance of an uplink packet transmission by varying the TTI in a system that supports an Enhanced Uplink Dedicated transport Channel (E-DCH).

Another object of the present invention is to provide a method and apparatus capable of efficiently changing the TTI if it is intended to enhance the performance of an uplink packet transmitting system by variably controlling the TTI in an environment in which the HARQ is supported.

Still another object of the present invention is to provide parameters defined in order to implement the TTI changing method as proposed above.

In order to accomplish the above and other objects, a user equipment (U-E) method according to a first embodiment of the present invention comprises the steps of receiving a Transmit Time Interval (TTI) change signal for instructing a TTI change; changing the TTI at a time point indicated by the TTI change signal according to the TTI change signal and setting a new Hybrid Automatic Repeat Request (HARQ) processes according to the changed TTI; and retransmitting at least one of the HARQ processes of the previous TTI through the same HARQ process of the changed TTI and transmitting new data through the remaining HARQ processes of the changed TTI after changing the TTI according to an acknowledge/negative acknowledge (ACK/NACK) signal.

A UE device according to the first embodiment of the present invention comprises a soft buffer for storing data to be transmitted based on HARQ processes; a control unit for controlling the HARQ processes according to a TTI change signal; a coding unit for coding the data under the control of the control unit; and an HARQ control unit for changing the TTI at a time point indicated by the TTI change signal according to the TTI change signal, setting new HARQ processes according to the changed TTI, retransmitting at least one of the HARQ processes of the previous TTI through the same HARQ process of the changed TTI and transmitting new data through remaining HARQ processes of the changed TTI after changing the TTI according to an acknowledge/negative acknowledge (ACK/NACK) signal under the control of the control unit.

A base station (Node B) method according to the first embodiment of the present invention comprises the steps of receiving a TTI change signal for providing a TTI change; changing the TTI of an acknowledge/negative acknowledge (ACK/NACK) channel at a time point indicated by the TTI change signal according to the TTI change signal; determining whether packet data received from a user equipment (UE) is transmitted by a HARQ process of the previous TTI or by a HARQ process of the changed TTI after changing the TTI; and if the packet data is transmitted according to the changed TTI, transmitting an ACK/NACK response according to an existence/nonexistence of an error in the packet data to the UE through the ACK/NACK channel.

A Node B device according to the first embodiment of the present invention comprises a TTI controller for generating new TTI information according to a changed TTI if a TTI change signal for instructing a TTI change is received; a physical layer controller for determining a unit of processing time of an acknowledge/negative acknowledge (ACK/NACK) channel according to the new TTI information; and an ACK/NACK generator for determining whether packet data received from a user equipment (UE) is transmitted by an HARQ process of the previous TTI or by an HARQ process of the changed TTI after changing the TTI of the ACK/NACK channel in synchronization with the unit of processing time of the ACK/NACK channel according to the new TTI information, and if the packet data is transmitted according to the changed TTI, transmitting an ACK/NACK response according to an existence/nonexistence of an error in the packet data through the ACK/NACK channel.

A UE method according to a second embodiment of the present invention comprises the step of receiving a first TTI change signal for instructing a TTI change; calculating a time point of a second TTI change based on the first TTI change signal and a time point of completion of previous TTI HARQ processes; and performing the previous TTI HARQ processes before the time point of the second TTI change, and transmitting new data by setting HARQ processes of the changed TTI at the time point of the second TTI change.

A UE device according to the second embodiment of the present invention comprises a soft buffer for storing data to be transmitted based on HARQ processes; a control unit for calculating a time point of a second TTI change in consideration of a first TTI change signal and a time point of completion of previous TTI HARQ processes, and controlling the HARQ processes according to the time point of the second TTI change; a coding unit for coding the data under the control of the control unit; and a HARQ control unit for performing the previous TTI HARQ processes before the time point of the second TTI change, and transmitting new data by setting HARQ processes of the changed TTI at the time point of the second TTI change.

A Node B method according to the second embodiment of the present invention comprises the steps of receiving a first TTI change signal for instructing a TTI change; calculating a time point of a second TTI change in consideration of the first TTI change signal and a time point of completion of previous TTI HARQ processes; transmitting an acknowledge/negative acknowledge (ACK/NACK) response through an ACK/NACK channel according to the previous TTI until the second TTI change time arrives after the first TTI change time; and changing the TTI of the ACK/NACK channel at the time point of the second TTI change, and transmitting the ACK/NACK response through the ACK/NACK channel according to the changed TTI.

A Node B device according to the second embodiment of the present invention comprises a TTI controller for calculating a time point of a second TTI change in consideration of a first TTI change signal and a time point of completion of previous TTI HARQ processes if the first TTI change signal for instructing a TTI change is received, and generating new TTI information according to the changed TTI at the time point of the second TTI change; a physical layer controller for determining a unit of processing time of an acknowledge/negative acknowledge (ACK/NACK) channel according to the changed TTI information; and an ACK/NACK generator for changing the TTI of the ACK/NACK channel at the time point of the second TTI change, and transmitting a ACK/NACK response through the ACK/NACK channel according to the changed TTI.

A method according to a third embodiment of the present invention comprises the steps of receiving a first TTI change signal for providing a TTI change; changing a TTI at a time point when the first TTI change signal is received according to a first TTI change mode predetermined if the changed TTI is shorter than the previous TTI; and changing the TTI at a time point of a second TTI change that is determined in consideration of the first TTI change signal and a time point of completion of previous TTI HARQ processes according to a second TTI changed mode predetermined if the changed TTI is longer than the previous TTI.

An apparatus according to the third embodiment of the present invention comprises a soft buffer for storing data to be transmitted based on HARQ processes; a control unit for controlling the HARQ processes so as to change a TTI at a time point when a first TTI change signal is received according to a first TTI change mode predetermined if the changed TTI is shorter than the previous TTI, and to change the TTI at a time point of a second TTI change that is determined based on the first TTI change signal and a time point of completion of previous TTI HARQ processes according to a second TTI changed mode predetermined if the changed TTI is longer than the previous TTI; a coding unit for coding the data under the control of the control unit; and a HARQ process control unit for performing the HARQ processes under the control of the control unit.

A method according to a fourth embodiment of the present invention comprises the steps of receiving a TTI change signal for providing a TTI change; terminating HARQ processes of a previous TTI at a time point indicated by the TTI change signal according to the TTI change signal, and changing the TTI according to the TTI change signal; and transmitting new data by HARQ processes of the changed TTI after changing the TTI.

An apparatus according to the fourth embodiment of the present invention includes a soft buffer for storing data to be transmitted based on HARQ processes; a control unit for terminating HARQ processes of a previous TTI at a time point indicated by the TTI change signal according to the TTI change signal, and setting a HARQ of the changed TTI; a coding unit for coding the data under the control of the control unit; and a HARQ control unit for transmitting new data by HARQ processes of the changed TTI under the control of the control unit.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Embodiments of the present invention will be described in detail hereinafter with reference to the accompanying drawings. In the following description of the present invention, a detailed description of known functions and configurations incorporated herein will be omitted for conciseness. The terms to be described later are terms defined in consideration of their functions in the present invention, and they may be different in accordance with the intention of a user/operator or custom. Accordingly, they should be defined based on the contents of the whole description of the present invention.

According to embodiments of the present invention data remaining in a soft buffer at a time point when the TTI is changed is deleted and not transmitted. However, in a system to which the Hybrid Automatic Repeat Request (HARQ) is applied, the transmission power used for each transmission is set so that the block error rate after the maximum retransmission becomes below a predetermined level in consideration of the total number of transmission times, and thus if the retransmission is not performed, it will almost be impossible to achieve a normal reception of the corresponding data. If the kind of such packet data service corresponds to the AM of an RLC layer, it may be possible to restore the data through the ARQ at an RLC level, but the efficiency of the HARQ deteriorates. According to the present invention, if the TTI is changed, four Transmit Time Interval (TTI) changing methods that can reduce the data loss through the maximum normal proceeding of the HARQ have been proposed as follows.

Method 1: A method of retransmitting the data using the changed TTI.

Method 2: A method of changing the TTI after the proceeding HARQ is completed.

Method 3: A method of using the TTI changing method in a different manner according to the condition.

Method 4: A method of discarding all data remaining in a soft buffer and transmitting only new data using the changed TTI if the TTI is changed during the HARQ operation.

Hereinafter, the respective methods will be explained through embodiments of the present invention.

First Embodiment

According to the first embodiment of the present invention, a method of retransmitting the data that remains in a soft buffer using the changed TTI if the TTI is changed during the HARQ operation is provided.

Hereinafter, the problems to be solved when the TTI is changed will be explained with reference to FIGS. 4A and 4B.

Figure 1:
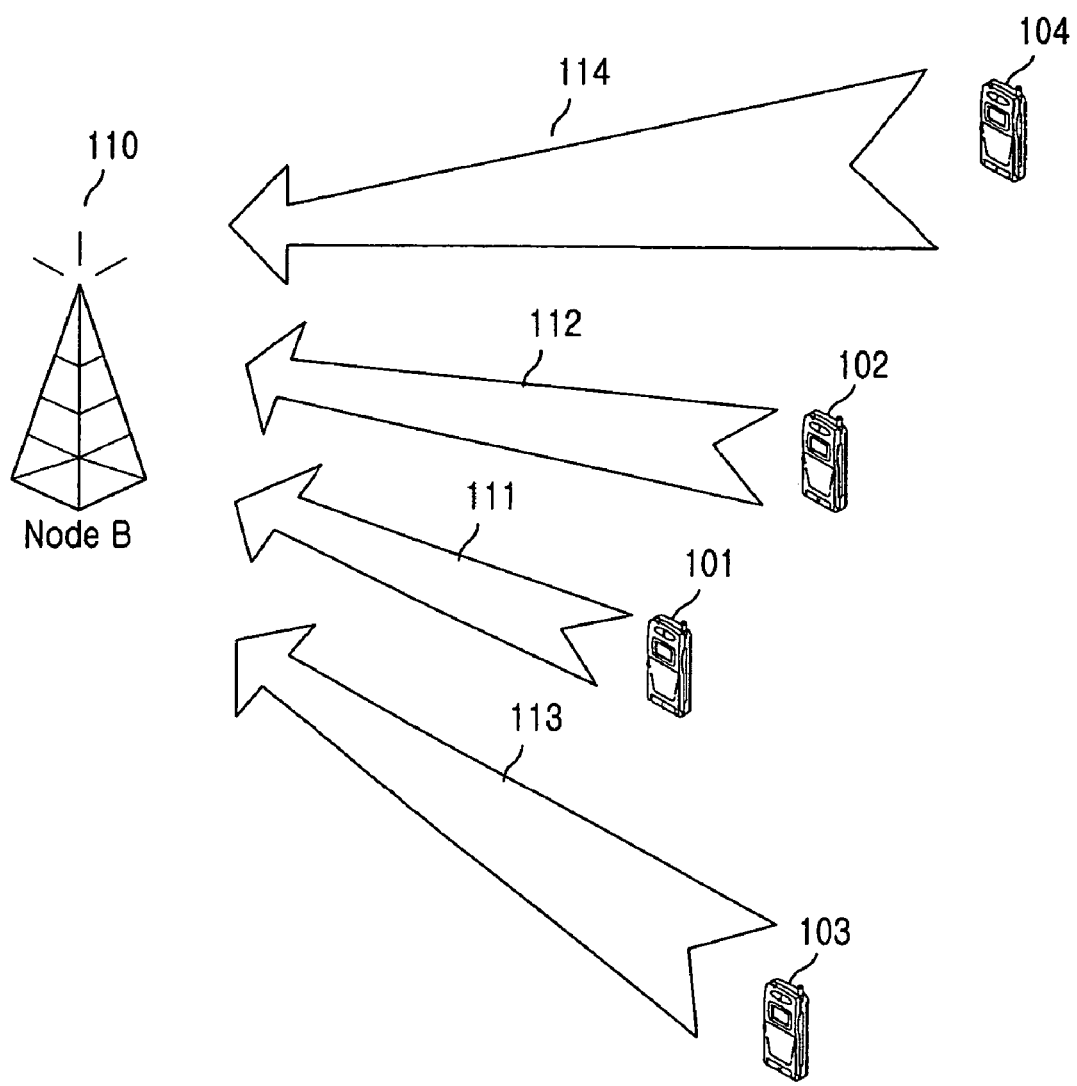
FIG. 1 is a diagram illustrating an operation of a conventional Enhanced Uplink Dedicated transport Channel (E-DCH)
Figure 2:
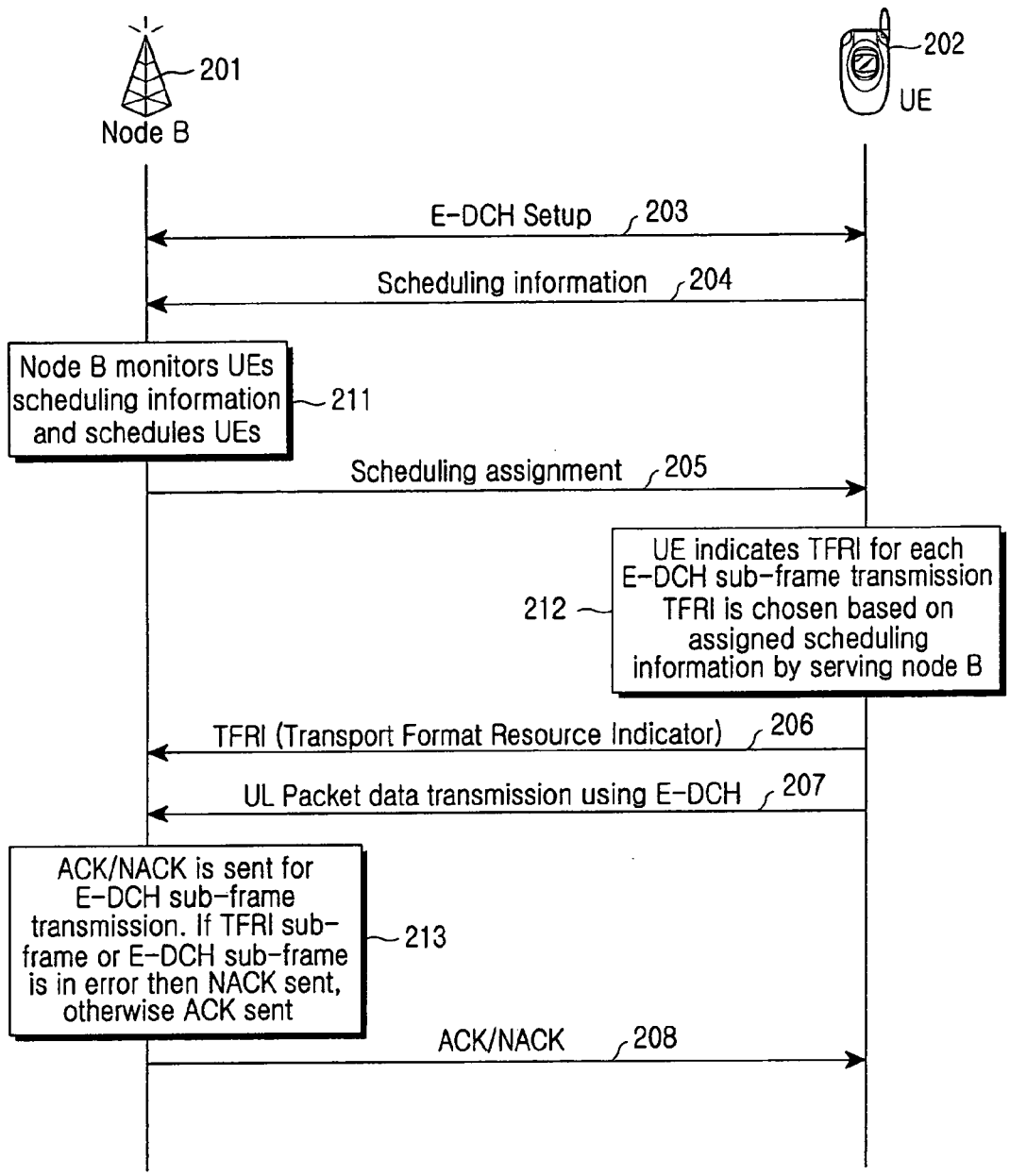
FIG. 2 is a diagram illustrating a conventional transmitting/receiving operation of the E-DCH service.
Figure 3:
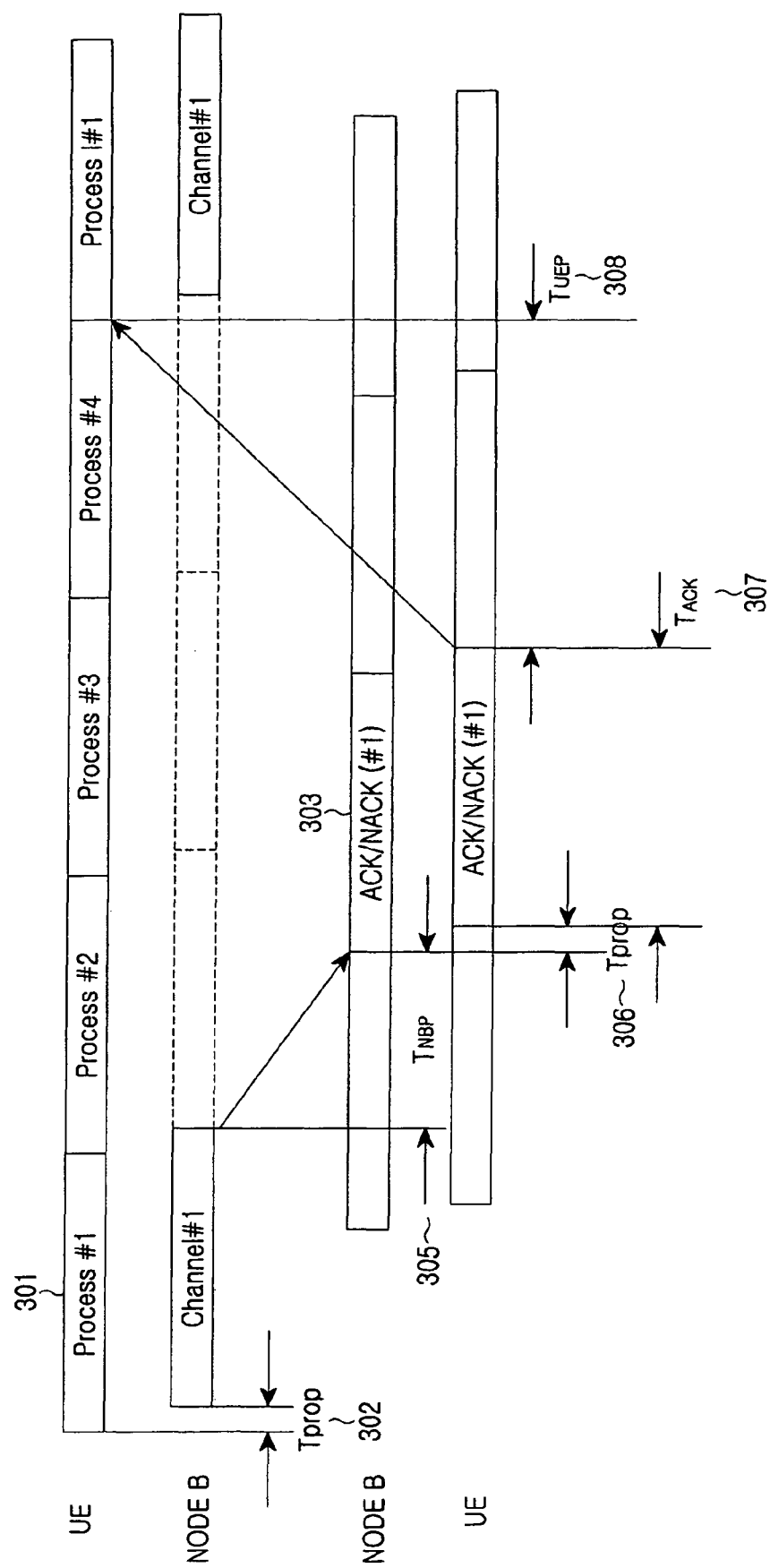
FIG. 3 is a diagram illustrating the packet data transmission that supports a conventional Hybrid Automatic Repeat Request operation.
Figure 4A:
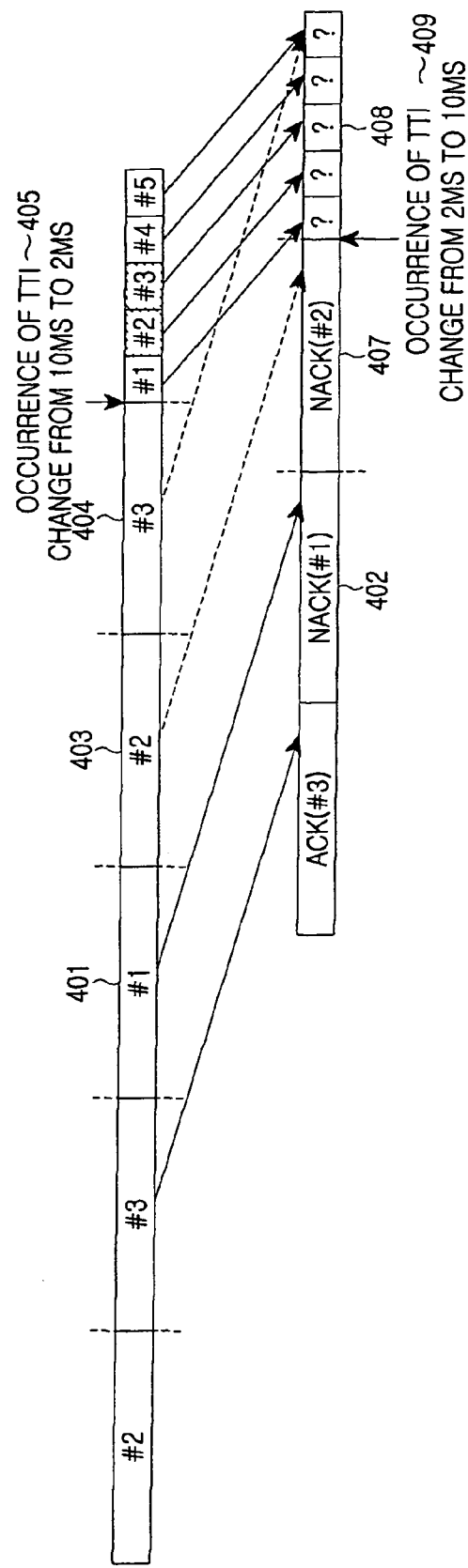
FIGS. 4A and 4B are diagram illustrating problems occurring when a Transmit Time Interval (TTI) is changed.

FIG. 4aA is a view illustrating the case that the TTI is changed from 10 ms TTI to 2 ms TTI. Referring to FIG. 4A, in the UE, the TTI is changed in a frame 405, and in the Node B, the TTI is changed in a frame 409. In this case, the respective states of the HARQ process are as follows. Just before the TTI is changed, it is possible to receive the ACK/NACK response in the case of the HARQ process #1 401, but it is impossible to receive the ACK/NACK signal before the time point of the next process transmission in the case of the HARQ processes #2 and #3 403 and 404, respectively. In the Node B, the ACK/NACK signal of #3 should also be transmitted, but after the TTI is changed, its transmission time overlaps the ACK/NACK transmission time of the packet being transmitted for the TTI of 2 ms. For a normal HARQ operation, whether to transmit the ACK/NACK signal with respect to a part of the packet data of 10 ms TTI or 2 ms TTI should be determined.

Figure 4B:
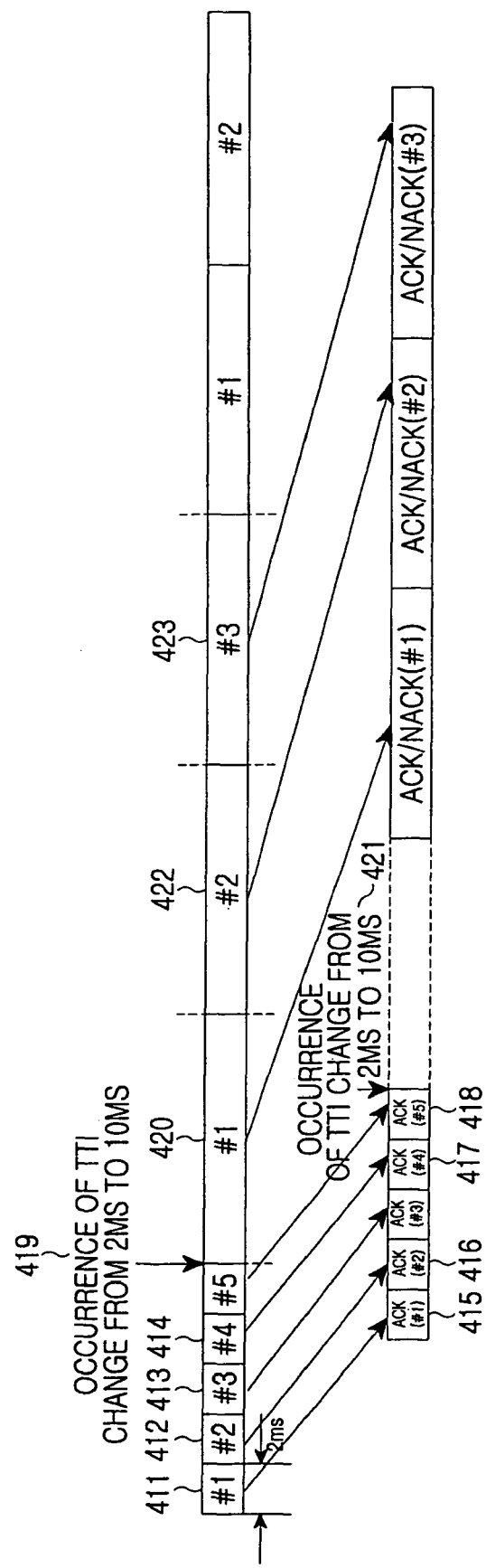

FIG. 4B is a view illustrating the case that the TTI is changed from 2 ms TTI to 10 ms TTI. In the case of simply applying the method 1, the following problems occur. In the case in which the TTI is shifted from 10 ms to 2 ms, the overlap of the ACK/NACK transmissions does not occur, but the retransmission problem occurs due to the difference between the numbers of HARQ processes.

Referring to FIG. 4B, in the case of performing the retransmission although the ACK/NACK information for the packets 413 and 414 is normally received, the Node B cannot perform a normal soft combining since the soft buffer that is mapped at 10 ms TTI is not allocated.

Hereinafter, in the method 1 according to an embodiment of the present invention, the case that the retransmission is performed only with respect to the data being transmitted through HARQ processes having the soft combining function will be explained.

In this case, if the transmission period of the corresponding HARQ process arrives although the ACK/NACK signal is not received with respect to the data to be retransmitted (i.e., remaining in the existing soft buffer) just after the TTI is changed, the UE performs the retransmission of the data that remains in the soft buffer.

Hereinafter, a preferred TTI changing method to which the method 1 according to an embodiment of the present invention is applied will be explained in detail.

Figure 5A:
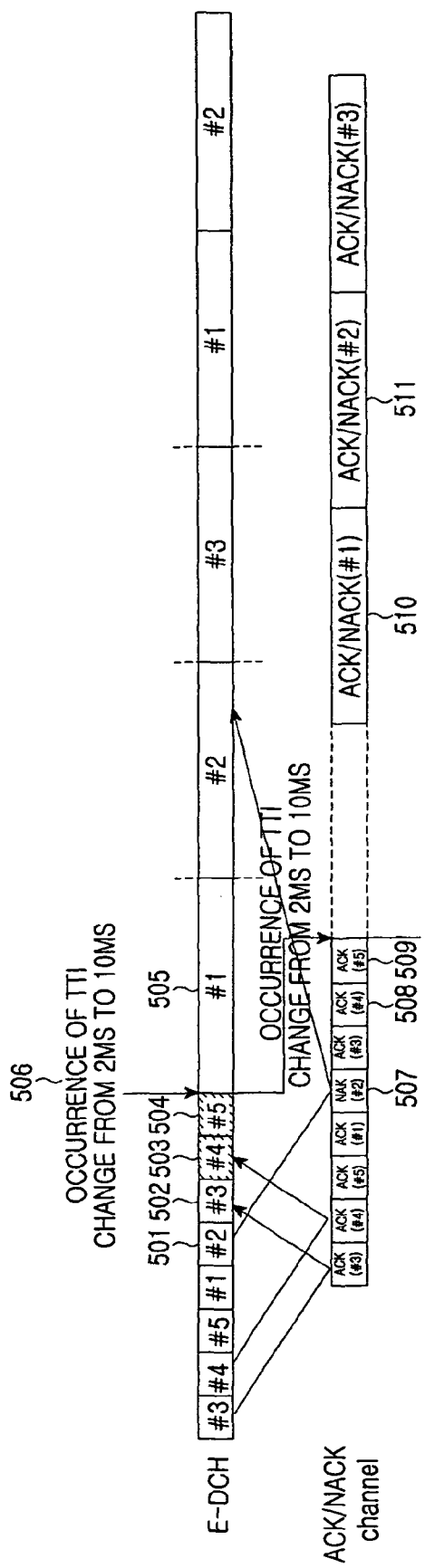
FIGS. 5A and 5B are diagrams illustrating a channel structure according to a first embodiment of the present invention.
Figure 5B:
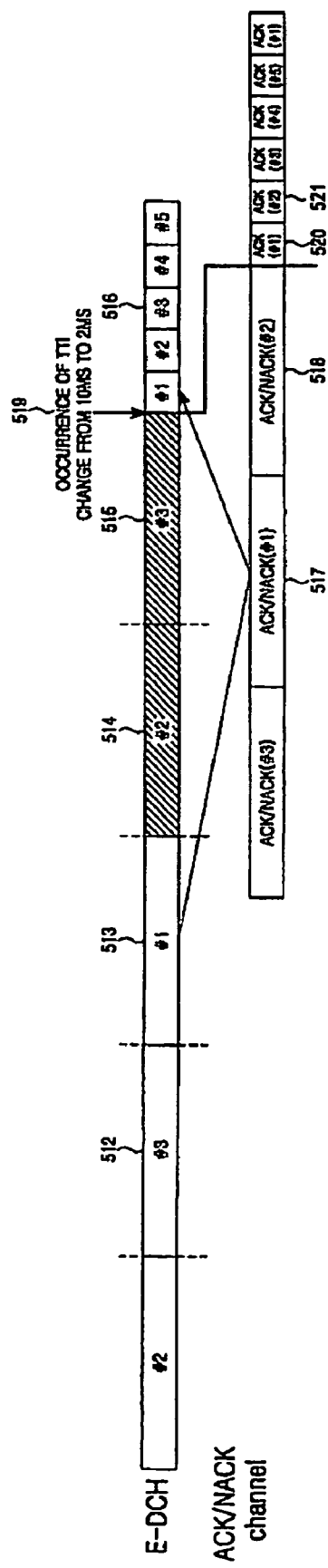

FIGS. 5A and 5B are diagrams illustrating the operation of the method 1 according to an embodiment of the present invention. Here, in the case of the 2 ms TTI, the number of HARQ processes is set to 5, and in the case of the 10 ms TTI, the number of HARQ processes is set to 3. Since information about the time point of the TTI change can be set in the unit of a Connection Frame Number (CFN), it is generated in the unit of a frame. In the Node B, the TTI change is performed in the CFN of the ACK/NACK channel that coincides with the time point when the TTI of the UE is changed in consideration of the HARQ.

FIG. 5A illustrates the case that the TTI is changed from the 2 ms TTI to the 10 ms TTI. As illustrated in FIG. 5A, the UE transmits packet data through the dedicated data channel (D-DCH) using the HARQ processes #1, #2, #3, #4 and #5 in the unit of 2 ms, and the Node B determines the ACK/NACK signals with respect to the packet data, and transmits the ACK/NACK signal to the UE through the downlink ACK/NACK channel. The UE retransmits the packet data or initially transmits another packet data based on the ACK/NACK signal.

At the time point 506, the UE receives the information about the TTI change, changes the TTI according to the changed TTI information, and then sets new HARQ processes according to the changed TTI. After the TTI is changed, the UE starts the transmission of packet data in the unit of the changed TTI as denoted as 505 in FIG. 5A. In this case, the HARQ operation is performed as follows. If the TTI is shifted from the 2 ms TTI to the 10 ms TTI, the time point of the ACK/NACK signal transmission with respect to the 10 ms TTI does not overlap the time point of the ACK/NACK signal transmission with respect to the 2 ms TTI, and thus the UE can receive the ACK/NACK response to all the HARQ processes of the 2 ms TTI. For example, if the UE receives the NACK response 507 from the Node B with respect to the packet data of #2 that the UE transmitted at 2 ms TTI, the UE does not process the retransmission of the packet data of #2 using the HARQ process #2 of the 2 ms TTI, but processes the packet data using the HARQ process #2 of the 10 ms TTI. However, since in the case of the packet data of #4 and #5 503 and 504, it is impossible to perform the soft combining in the HARQ process of the 10 ms TTI, the UE deletes the data in the soft buffer related to the HARQ processes #4 and #5 of the 2 ms TTI irrespective of the ACK/NACK response. Additionally, even if the TFC set of the 2 ms TTI is not equal to the TFC set of the 10 ms and there is no TFC that can be supported in the changed TTI after the TTI shift, the UE deletes the data in the soft buffer related to the previous HARQ processes.

FIG. 5B illustrates the case that the TTI is changed from the 10 ms TTI to the 2 ms TTI. As illustrated in FIG. 5B, the UE changes the TTI to match the TTI change information given through an upper signaling in the same manner as the method of changing the TTI from the 2 ms TTI to the 10 ms TTI. In the case of the downlink ACK/NACK channel, the TTI is changed at a time point when the frame of the downlink ACK/NACK channel corresponding to the time point when the E-DCH is terminated. In the case of the 10 ms HARQ process #1 513, since it is possible to receive the ACK/NACK signal, the 2 ms HARQ process #1 516 receives the ACK/NACK response 517 to the 10 ms HARQ process #1 513, and retransmits the corresponding packet data if the ACK/NACK response 517 is the NACK response. However, in the case of the 10 ms processes #2 and #3 514 and 515, it is impossible to receive the ACK/NAC response corresponding to the 10 ms HARQ processes #2 and #3 514 and 515 until the time point when the 2 ms HARQ processes #2 and #3 start the transmission of the packet data. This is because the TTI of the ACK/NACK channel is changed at the time point when the downlink ACK/NACK channel 519 is terminated. Accordingly, as denoted as 516 in FIG. 5B, the 2 ms HARQ process #3 516 retransmits the corresponding packet data irrespective of the ACK/NACK response related to the 10 ms HARQ process #3 515.

Hereinafter, procedures performed by a UE and a node B for the TTI change when the method 1 according to the present invention is applied will be explained with reference to FIG. 6A. If the TTI is changed and data transmitted at the previous TTI exists in the soft buffer, that is, if the retransmitted data exists, the UE operates according to the procedure of FIG. 6A until the HARQ operation of the corresponding data is terminated. The UE performs the procedure of FIG. 6A with respect to the HARQ processes operated at the previous TTI.

Figure 6A:
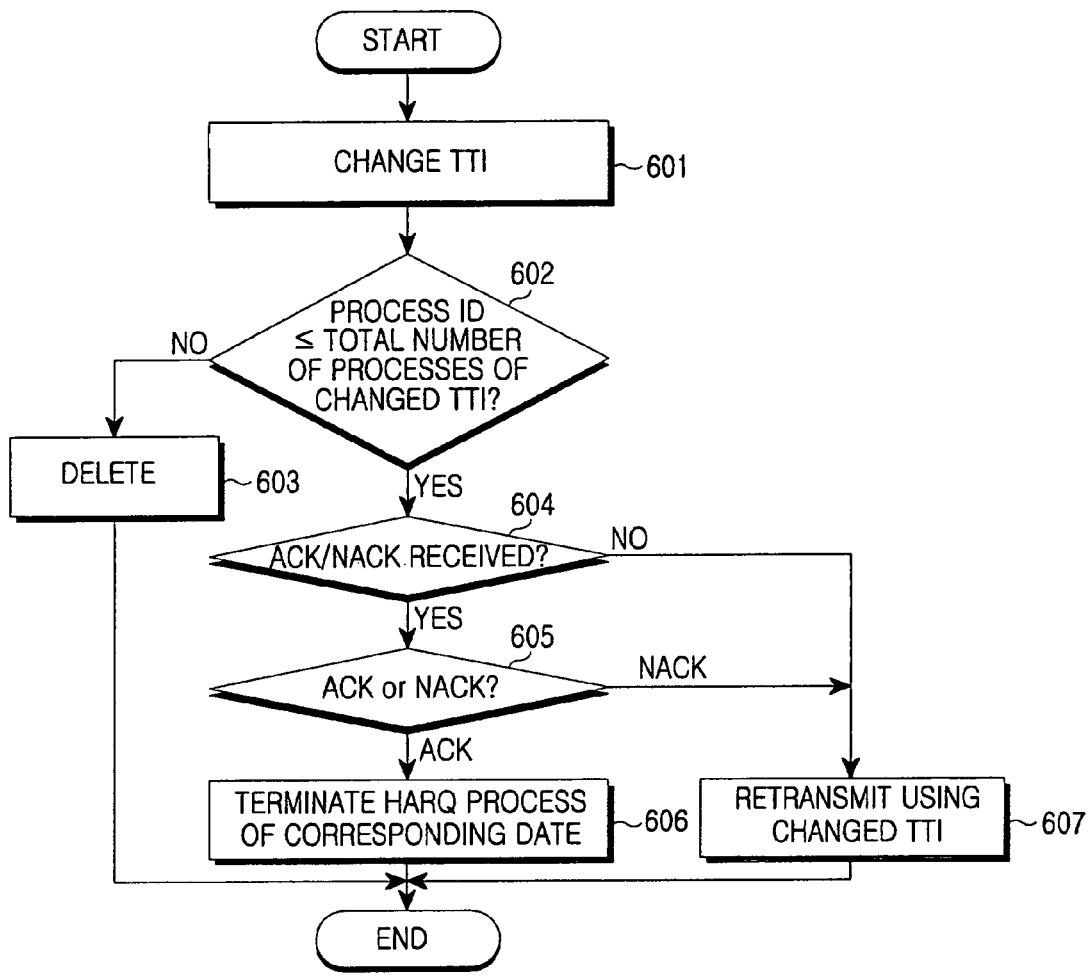
FIGS. 6A and 6B are flowcharts illustrating procedures performed by a user equipment (UE) and a node B for implementing a first embodiment of the present invention.

Referring to FIG. 6A, the UE changes the TTI to match the time point of TTI change given by an upper signaling at step 601. The UE checks if the number of HARQ process IDs that operate at the previous TTI is less than or equal to the total number of HARQ processes of a new TTI at step 602, and if the number of HARQ process IDs is larger than the total number of HARQ processes of the new TTI, the UE deletes the data in the soft buffer related to the HARQ process that operates at the previous TTI at step 603.

By contrast, if the HARQ process ID can be supported in the new TTI, the UE checks whether the ACK/NACK response with respect to the data corresponding to the HARQ process ID is received at step 604, and if the ACK/NACK response is received, the UE checks whether the ACK/NACK response is the ACK response or the NACK response at step 605. If no response is received or the NACK response is received, the UE performs the retransmission of the corresponding data at step 607. Here, the retransmission is performed through the HARQ process of the changed TTI that has the same HARQ process ID as the above-described HARQ process ID.

If the ACK response is received as a result of checking, the UE completes the HARQ process operation, i.e., the retransmission operation, of the corresponding data at step 606.

Figure 6B:
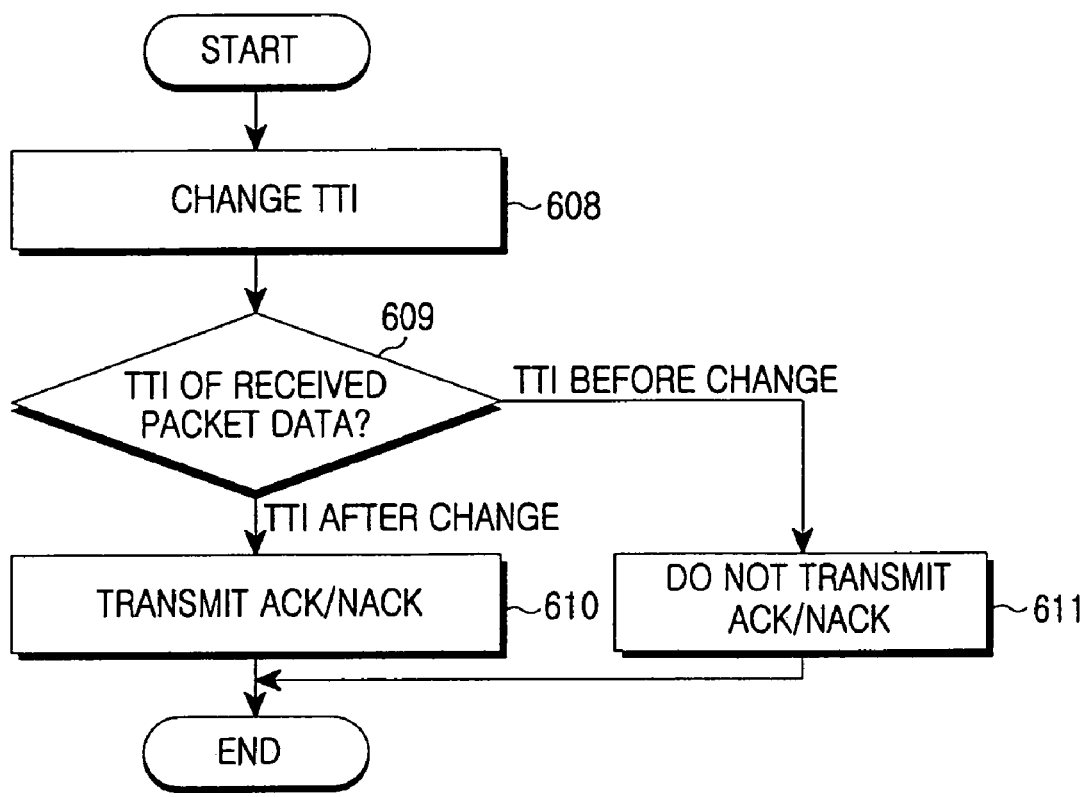

In the case of the Node B, the procedure as illustrated in FIG. 6B is required. That is, the Node B changes the TTI of the ACK/NACK channel to match the time point of the E-DCH change at step 608, and confirms the TTI of the packet data received through the E-DCH at step 609. If the TTI of the received packet data is the previous TTI, the Node B does not transmit the ACK/NACK signal at step 611, while if the TTI is the new TTI, it transmits the ACK/NACK signal at step 610.

Hereinafter, a preferred transmitting/receiving apparatus of the Node B and the UE for implementing the first embodiment of the present invention will be explained.

Figure 7:
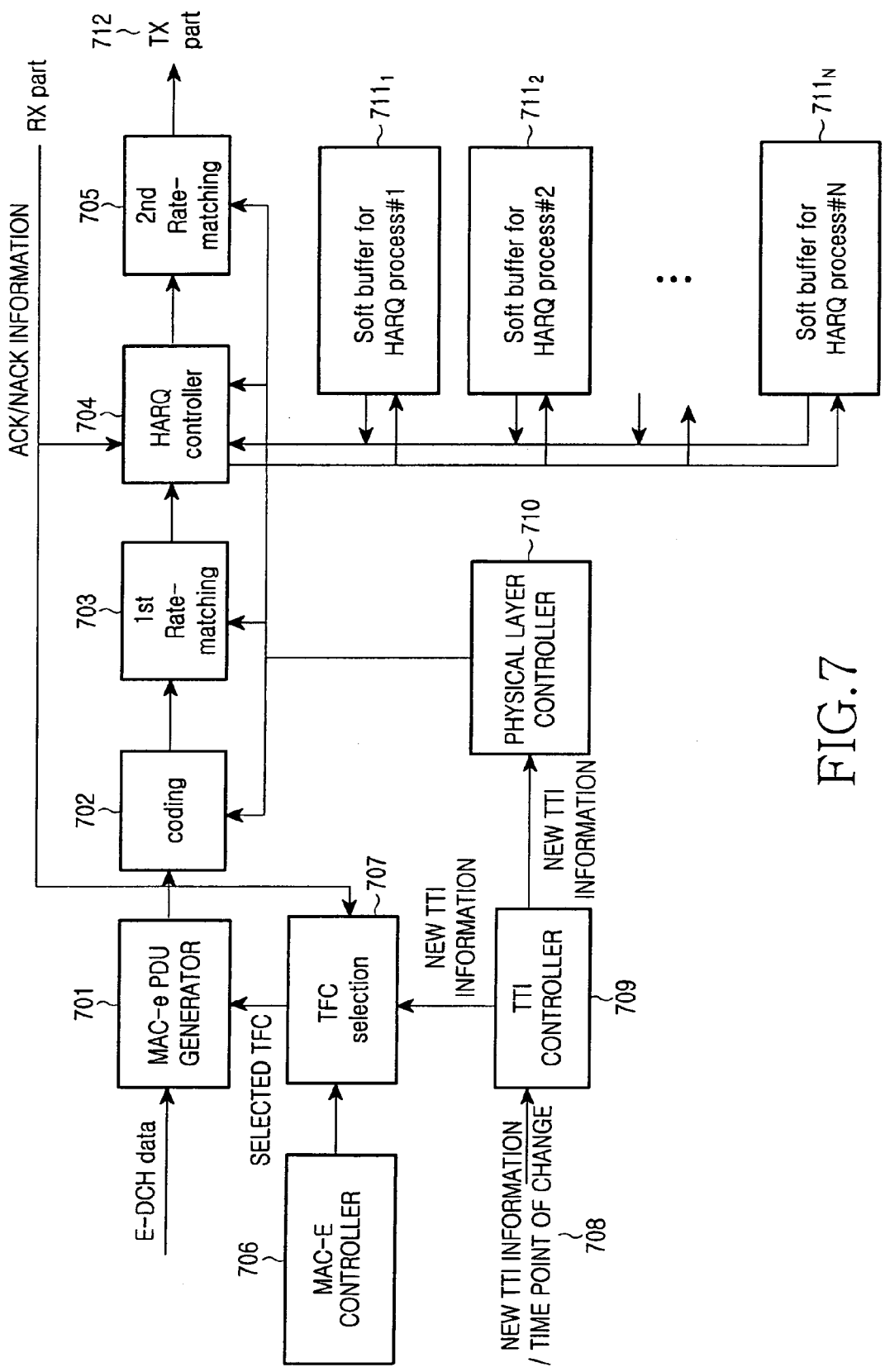
FIG. 7 is a block diagram illustrating the construction of a transmitting device of a UE for implementing the first embodiment of the present invention.

FIG. 7 is a block diagram illustrating the construction of the transmitting device of the UE according to the method 1 according to an embodiment of the present invention.

Referring to FIG. 7, the construction of a basic modulating/demodulating apparatus that has the same construction as the existing transmitter is omitted, and only a part of the whole construction that is necessary for explaining an embodiment of the present invention is illustrated in the drawings. Blocks 701, 702, 703 and 705 in FIG. 7 comprise a coding chain through which data is actually processed, and Media Access Control-e (MAC E-DCH) refers to an entity that takes charge of the process of the E-DCH. If the E-DCH data is produced, a MAC-e controller 706 determines the maximum data rate for transmitting the E-DCH data.

A TFC selection block 707 receives the maximum data rate information from the MAC-e controller 706, and selects the TFC accordingly. If information about the time point of TTI change and the new TTI is given, a TTI controller 709 transfers the new TTI information to the TFC selection block 707 and a physical layer controller 701 at the time point of TTI change. If the TFC is selected, the MAC-e PDU generating unit 701 generates a MAC-e PDU that includes the E-DCH data, and the MAC-e PDU is transferred to a HARQ controller 704 through a coding unit 702 and a first rate matching unit 703.

The HARQ controller 704 stores the data, to which the ACK/NACK response is not received within the maximum number of retransmission times, in a soft buffer 711 for the respective HARQ processes. If the ACK signal is received, the HARQ controller empties the soft buffer, and if the NACK signal is received, it outputs the data stored in the soft buffer 711. Particularly, the HARQ controller 704 controls the retransmission process of the HARQ process according to the change of the TTI as illustrated in FIG. 6A. The data output from the HARQ controller 704 is modulated, spread and frequency-modulated by a transmitting unit 712 after passing through a second rate matching unit 705, and then transmitted to the Node B.

The blocks 702, 703, 704 and 705 receive control information through the physical layer controller 710. Particularly, if the TTI is changed, the physical layer controller 710 receives the new TTI information from the TTI controller 709, and provides the processing time unit according to the new TTI to the blocks 702 to 705.

Hereinafter, the receiving apparatus of the Node B will be explained with reference to FIG. 8.

Figure 8:
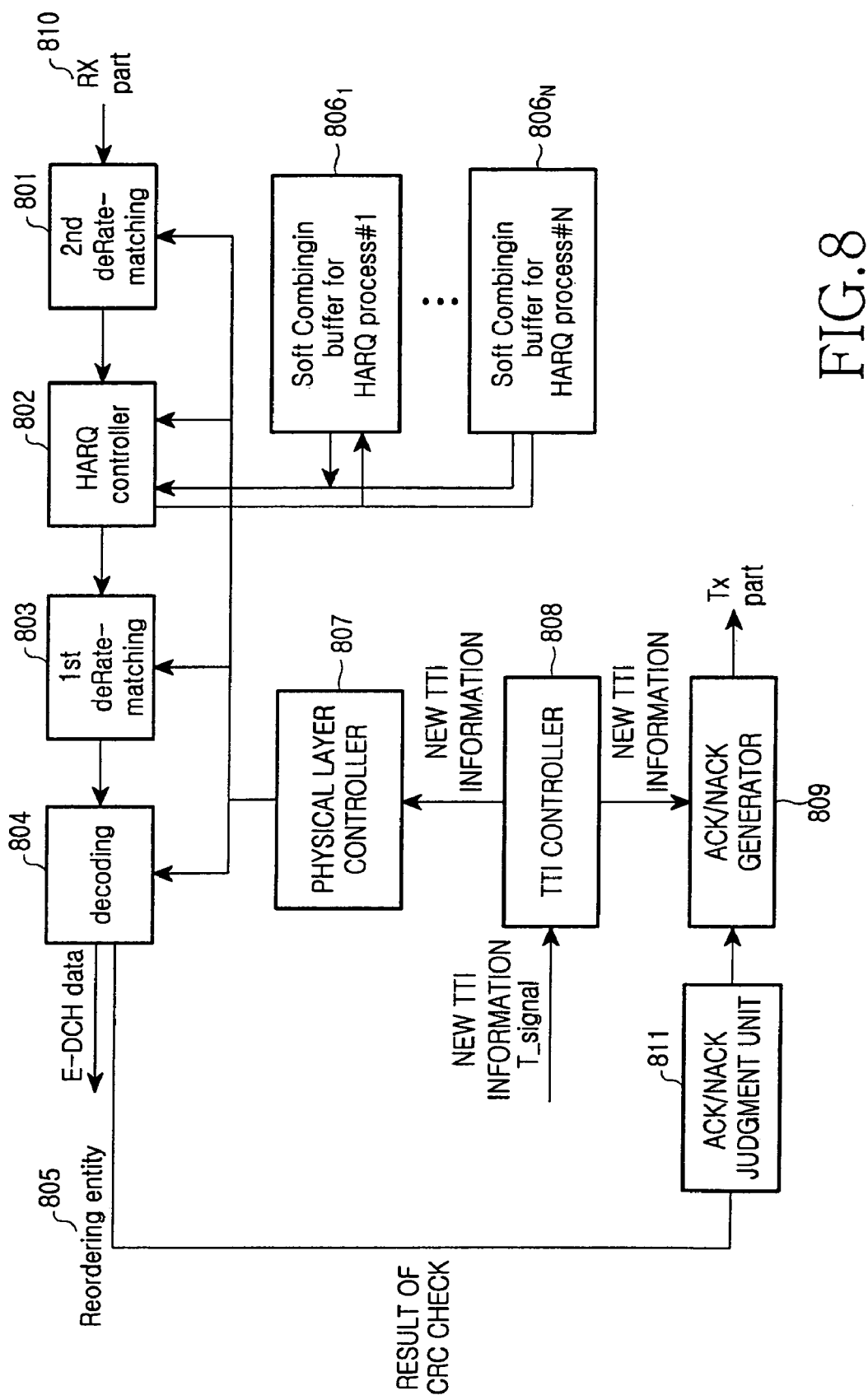
FIG. 8 is a block diagram illustrating the construction of a transmitting/receiving device of a Node B for implementing the first embodiment of the present invention.

Referring to FIG. 8, the reference numerals '801, 802, 803 and 804' denote a decoding chain for receiving the packet data. The data received through a receiving unit 810 is input to a HARQ controller 802 provided with soft combining buffers 806 for the respective HARQ processes through a second derate matching unit 801. The HARQ controller 802 determines whether the received data is the initially transmitted data or the retransmitted data. If the received data is the initially transmitted data, the HARQ controller 802 stores the data in the soft combining buffer 806 of the corresponding HARQ process, and if the received data is the retransmitted data, it performs a soft combining of the data with the data pre-stored in the soft combining buffer 806 of the corresponding HARQ process. The data output from the soft combining buffer 806 is decoded by the decoding unit 804 through a first derate matching unit 803. The decoding unit 804 performs a Cyclic Redundancy Code (CRC) check of the input data, and outputs a result of CRC check. If no error exists as the result of CRC checking, the E-DCH data output from the decoding unit 804 is transferred to a reordering entity 805.

An ACK/NACK judgment unit 811 determines whether an error exists in the received data through the result of CRC checking, and an ACK/NACK generator 809 generates an ACK or NACK signal based on the result of error determination and transmits the generated ACK or NACK signal to the UE through a transmitting unit (not illustrated). Particularly, the HARQ generator 809 controls the ACK/NACK transmission of the respective HARQ processes according to the change of the TTI as illustrated in FIG. 6B. If new TTI information and information about the time point of TTI change are given through an upper layer signaling, a TTI controller 808 transfers the new TTI information to a physical layer controller 807 and the ACK/NACK generator 809 to match the time point of TTI change. The physical layer controller 807 provides the processing time unit according to the new TTI information to the blocks 801 to 804.

Second Embodiment

According to the second embodiment of the present invention, a method of changing the TTI based on the HARQ result of the previous data before changing the TTI, i.e., a method of changing the TTI after completing the HARQ procedure of the data transmitted using the previous TTI, is proposed. In the case of applying this method, the TTI change is not performed at the time point when TTI change information required by the actual upper signaling is received, but is performed at the time point when the HARQ processes of the corresponding data of the previous TTI is completed.

Hereinafter, the TTI changing method by applying the method 2 according to the second embodiment of the present invention will be explained. In the second embodiment, the time point of the new TTI change is calculated in consideration of the time point when the TTI change information transferred by the signaling of the actual upper layer is received and the HARQ process before the TTI is changed. That is, in the second embodiment of the present invention, the UE changes the TTI according to the TTI change information at a time point when all the HARQ processes of the data before the TTI change is terminated.

Figure 9:
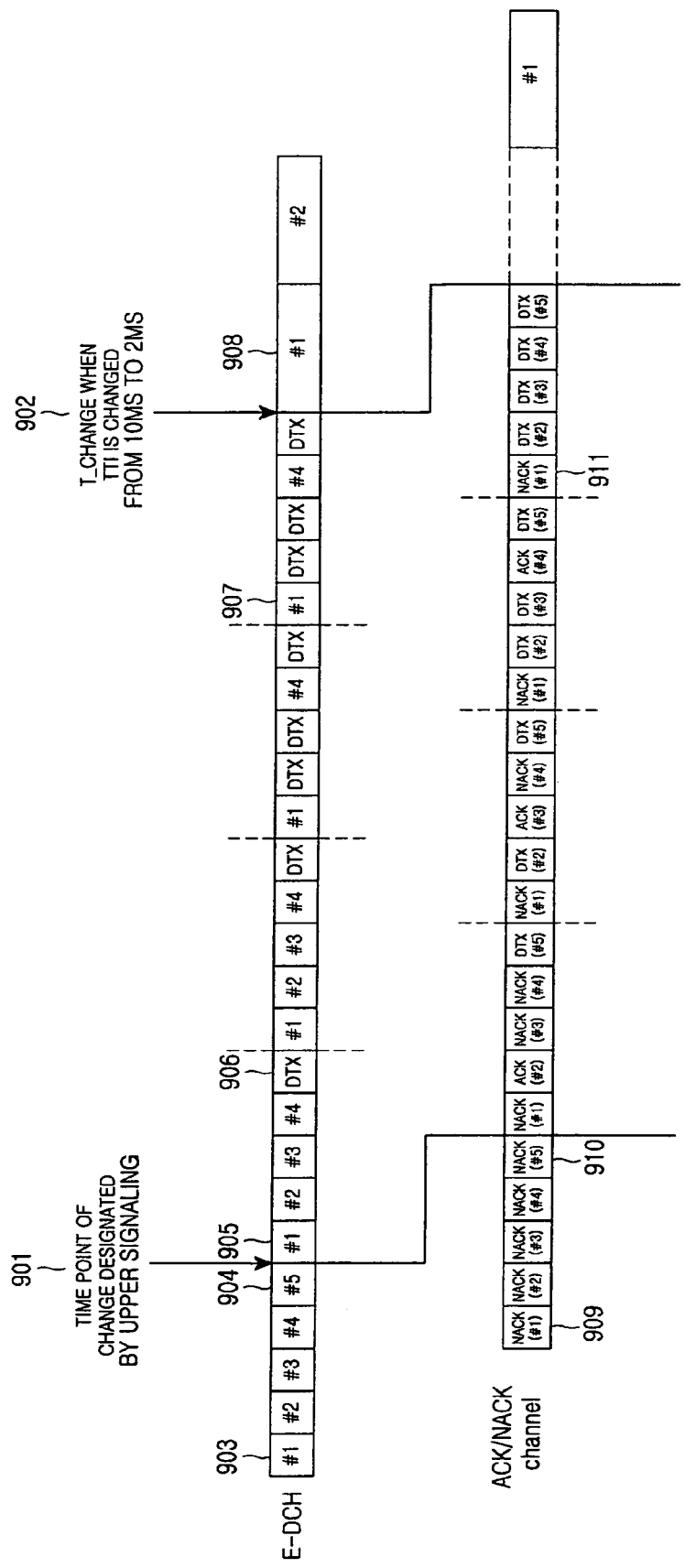
FIG. 9 is a diagram illustrating a channel structure in accordance with a second embodiment of the present invention.

Now, the TTI changing method according to the method 2 of the present invention will be explained with reference to FIG. 9. FIG. 9 illustrates the case that the TTI is changed from the 2 ms TTI to the 10 ms TTI. In the method 2, since the shift from the 2 ms TTI to the 10 ms is equal to the shift from the 10 ms TTI to the 2 ms TTI, a detailed explanation thereof will be omitted. First, it is assumed that information about the time point of TTI change pre-designated through the upper signaling is T1 901 and the actual time point of TTI change when the UE actually changes the TTI is T2 902. Here, it is assumed that the HARQ process that proceeds at the previous TTI is completely terminated. According to the general HARQ operation, if the number of retransmission times exceeds the maximum number of retransmission times although the NACK is received, the retransmission is not performed, but the next packet data is initially transmitted. Accordingly, the TTI is changed after the time required for the occurrence of the maximum retransmission with respect to the data transmitted at the previous 2 ms TTI from the time point of T1 901. That is, after all the HARQ processes proceeding at 2 ms TTI are terminated, i.e., at T2, the TTI is changed to 10 ms TTI and the corresponding HARQ processes are set by the changed 10 ms TTI, so that data loss due to the change to 10 ms TTI does not occur. In this case, in order to terminate all the HARQ processes proceeding at 2 ms TTI before the time point of T2, a new initial transmission is not performed after the time point of T1. The UE receives one value of T1 and T2 parameters through the upper signaling or physical layer signaling, and obtains the other value using Equation (1) as below. However, if T1 is before the present time point as a result of calculating T1 through the signaling of the T2 information, the UE does not perform the initial transmission of the E-DCH from T1. The relation between T1 901 and T2 902 are given by Equation (1).

$$T2 = (T1 + TTIcurrent) * (\text{Total number of HARQ processes (TTIcurrent)}) * (\text{Maximum number of retransmission times(TTIcurrent)}) \quad (1)$$

For example, if the total number of HARQ processes and the maximum number of retransmission times are set by TTIs as follows, the value of T2 902 can be obtained.

TABLE 1

| | Total Number of HARQ Processes | Maximum Number of Retransmission Times | T2 |
|---|---|---|---|
| 2 ms TTI | 5 | 3 | T1 + 30 ms |
| 10 ms TTI | 3 | 2 | T1 + 60 ms |

As described above, although the UE performs a general HARQ operation at T1 901, it does not perform the next initial transmission with respect to the HARQ process to which the response is received.

Referring to FIG. 9, since the HARQ process #5 904 receives the ACK signal 910, the initial transmission of the next packet data becomes possible. However, since the data should be transmitted at 10 ms TTI after T2 902, the HARQ process does not transmit the new data, but maintains the DTX state 906. By contrast, since the HARQ process #1 903 receives the NACK signal 909 and thus requires the retransmission, the retransmission is performed through the next HARQ process #1 905 at 2 ms TTI. Since most HARQ processes perform the retransmission up to the maximum number of retransmission times in the HARQ process just before the time point of T2 902, the probability of receiving the packet data is heightened, and thus the HARQ process of all data transmitted at 2 ms TTI can be completed. Exceptionally, in the case in which the NACK signal 911 is received after the maximum retransmission such as HARQ process #1 907, the retransmission is not performed any more even if the UE receives the NACK signal, and thus the next packet data is initially transmitted. The above-described operation of the UE is to make no data remain in the soft buffer by terminating all the HARQ processes that perform the transmission at 2 ms TTI at the time point of T2 902.

Hereinafter, the TTI changing operation of the UE as above will be explained in detail with reference to FIG. 10.

Figure 10:
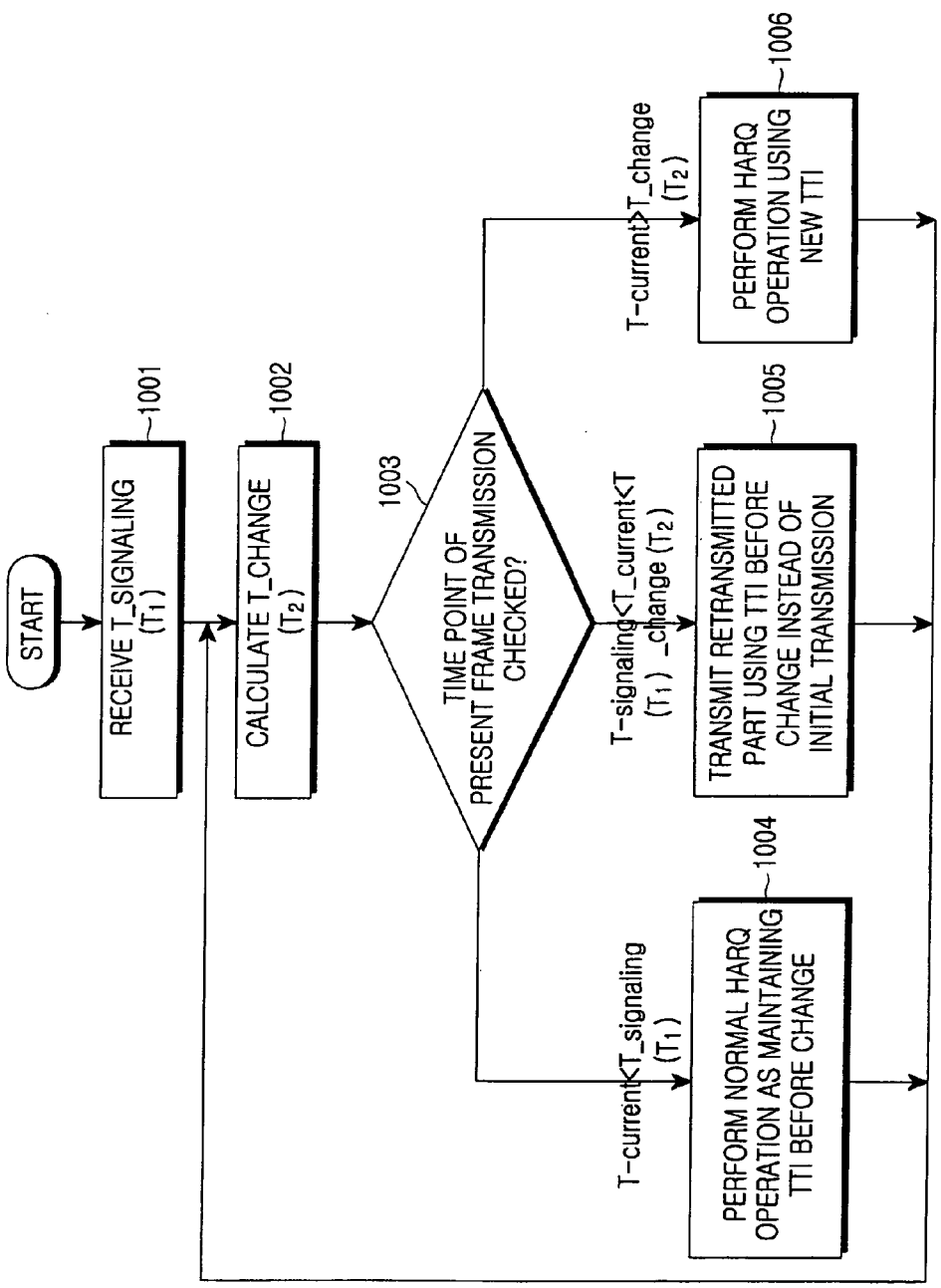
FIG. 10 is a flowchart illustrating a procedure performed by a UE for implementing the second embodiment of the present invention.

Referring to FIG. 10, the UE receives T1 information at step 1001, and calculates T2 through Equation (1) at step 1002. Here, if the values of T1 and T2 are set, the UE checks the time point of the present frame transmission at step 1003.

If the time point of the present frame transmission is prior to T1 as a result of checking, the UE performs a normal HARQ operation of the corresponding data as it maintains the 2 ms TTI that has not been changed at step 1004.

If the transmission of the present frame is in a period between T1 and T2 as a result of checking, the UE does not perform the initial transmission of the corresponding data, but performs the retransmission using the 2 ms TTI with respect to the retransmission part of the HARQ process of the 2 ms TTI to terminate all the HARQ processes proceeding at 2 ms TTI at step 1005.

If the transmission of the present frame is after T2, the UE performs the HARQ operation using the changed 10 ms TTI after the time point of T2 at step 1006. In the case of the Node B, no separate changed matters exist in the HARQ operation. That is, the Node B calculate the T2 value, and changes the TTI at the calculated time point of T2.

Hereinafter, a preferred transmitting/receiving apparatus of the Node B and the UE for implementing the second embodiment of the present invention will be explained.

Figure 11:
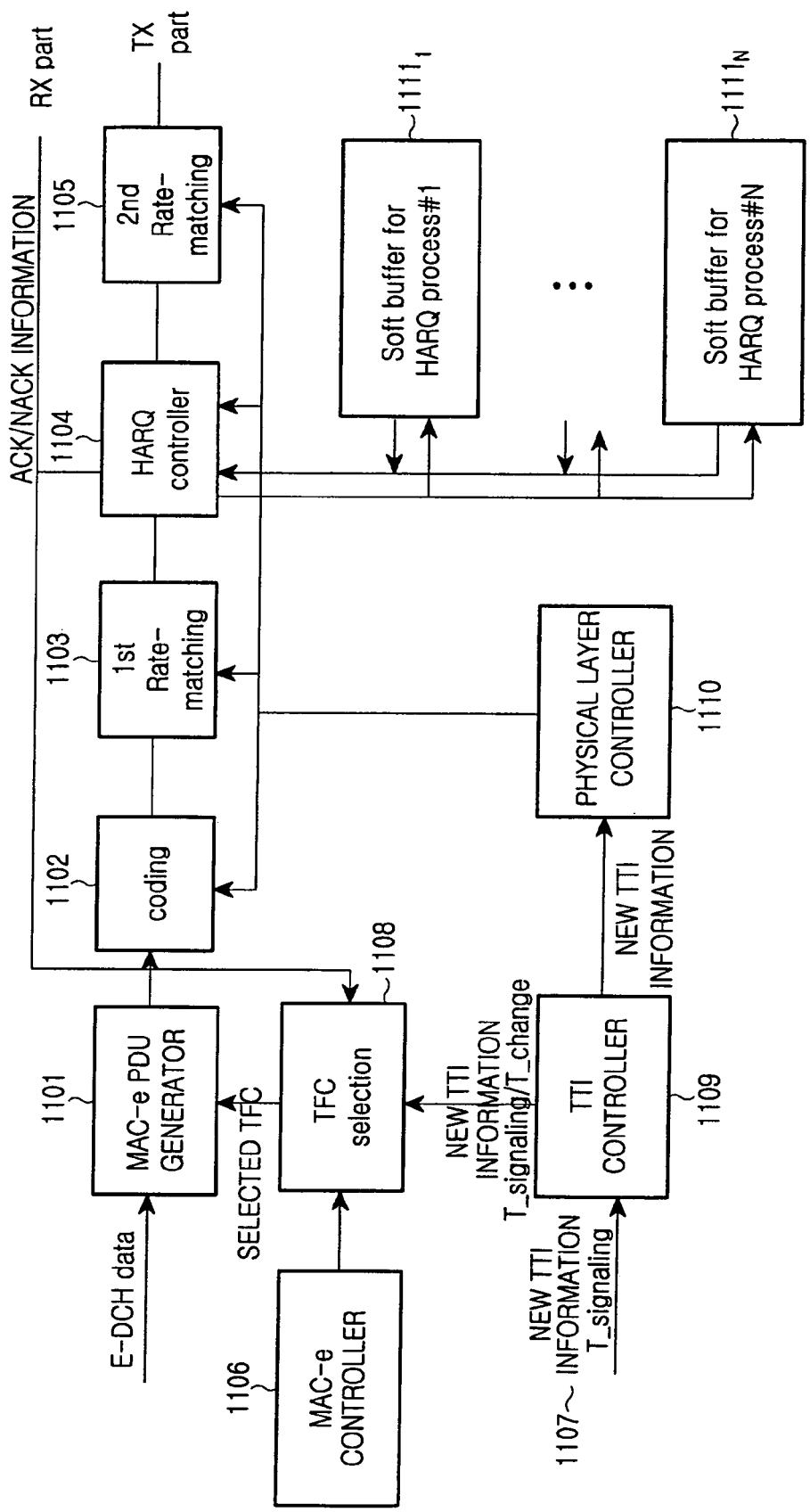
FIG. 11 is a block diagram illustrating the construction of a transmitting device of a UE for implementing the second embodiment of the present invention.

FIG. 11 is a block diagram illustrating the construction of the transmitting device of the UE according to the second embodiment of the present invention.

Referring to FIG. 11, the construction of a basic modulating/demodulating apparatus that has the same construction as the existing transmitter is omitted, and only a part of the whole construction is illustrated in the drawings. Blocks 1101, 1102, 1103 and 1105 in FIG. 11 comprise a coding chain through which data is actually processed. If the E-DCH data is produced, a MAC-e controller 1106 determines the maximum data rate for transmitting the E-DCH data. A TFC selection block 1108 receives the maximum data rate information from the MAC-e controller, receives the TTI information at the time point of the corresponding transmission from a TTI controller 1109, and determines whether to transmit and the TFC of the data to be transmitted. At that time, the TFC selection block 1108 receives information related to the new TTI from the TTI controller 1109, compares this information with the time point of the present frame transmission, and determines whether to transmit the retransmitted data and the TTI to be transmitted according to a result of comparison as shown in FIG. 10.

If a TTI change signal for requesting the TTI change is received through the upper signaling, the TTI controller 1109 calculates a time point T2 of TTI change for considering the time when the retransmission process of the previous HARQ processes according to the previous TTI is completed from the time point T1 of TTI change using Equation (1) as shown in FIG. 10, and sets the HARQ process according to the TTI changed at T2.

If the TFC is selected, the MAC-e PDU is generated and transferred to the modulating/demodulating unit through the coding unit 1102 and the rate matching units 1103 and 1105. An HARQ controller 1104 stores the data, to which the ACK/NACK response is not received within the maximum number of retransmission times, in a soft buffer 1111 for the respective HARQ processes. If the ACK signal is received, the HARQ controller empties the soft buffer, and if the NACK signal is received, it outputs the data stored in the soft buffer 1111. The blocks 1102, 1103, 1104 and 1105 receive control information through the physical layer controller 1110. Particularly, if the TTI is changed, the processing time is changed, and thus the physical layer controller 1110 receives the new TTI information from the TTI controller 1109 and provides the processing time unit according to the new TTI to the blocks 1102 to 1105.

Hereinafter, the receiving apparatus of the Node B will be explained with reference to FIG. 12.

Figure 12:
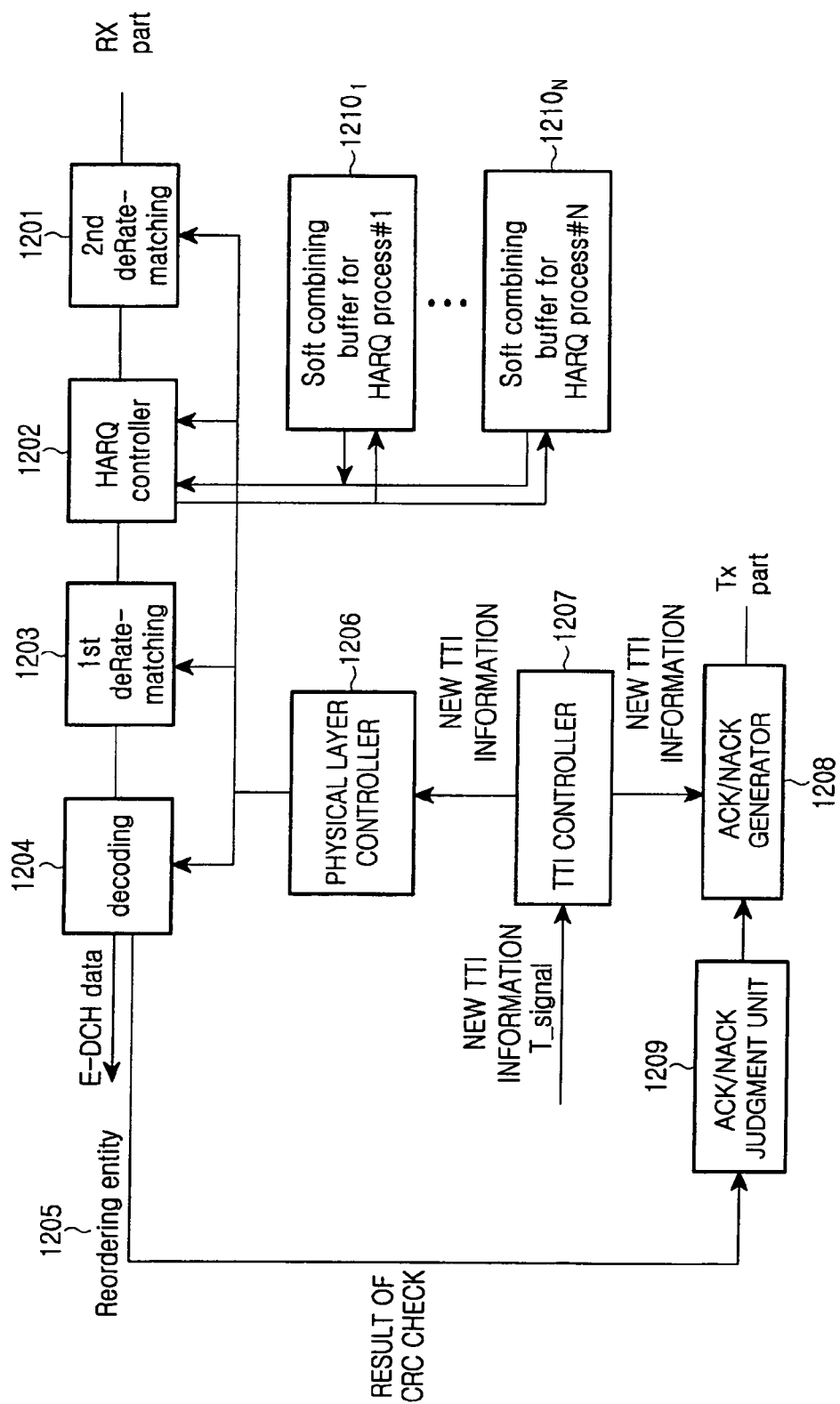
FIG. 12 is a block diagram illustrating the construction of a transmitting/receiving device of a Node B for implementing the second embodiment of the present invention.

As illustrated in FIG. 12, the reference numerals '1201, 1202, 1203 and 1204' denote a decoding chain for receiving the packet data.

In the case of the Node B, the packet data which is received and demodulated is input to a HARQ controller 1202 provided with soft combining buffers 1206 for the respective HARQ processes through derate matching units 1201 and 1203. The HARQ controller 1202 determines whether the received data is the initially transmitted data or the retransmitted data. If the received data is the initially transmitted data, the HARQ controller 1202 stores the data in the soft combining buffer 1210 of the corresponding HARQ process, and if the received data is the retransmitted data, it performs a soft combining of the data with the data pre-stored in the soft combining buffer 1210 of the corresponding HARQ process. The data output from the soft combining buffer 1210 is decoded by the decoding unit 1204 through the first derate matching unit 1203. The decoding unit 1204 performs a CRC check of the input data, and outputs a result of CRC check. If no error exists as the result of CRC checking, the E-DCH data output from the decoding unit 1204 is transferred to a reordering entity 1205.

If the TTI is changed, a TTI controller 1207 of the Node B receives the changed TTI information and calculates T2 based on the received information. In the case of the Node B, no particular measures are required after T1 unlike the UE, and thus the TTI controller 1207 transfers the new TTI information to a physical layer controller 1206 and an ACK/NACK generator 1208 at the time point when the TTI is actually changed. The physical layer controller 1206 sets again the coding chain corresponding to T1 or T2 based on the transferred information, and the ACK/NACK generator 1208 also sets the HARQ processes for the data transmission in the corresponding TTI unit.

Third Embodiment

Method 3 is a method of using the TTI changing method in a different manner according to the conditions.

According to the third embodiment of the present invention, a method of changing the TTI in a direction in which a more efficient shift can be performed in consideration of the delay conditions of the two embodiments as described above is provided. As described in the conventional method, It is efficient that the short TTI is used to support the service that is sensitive to delay, and the long TTI is used to support the service that is less sensitive to delay. Accordingly, it is preferable that in the case of changing the long TTI to the short TTI, the change to the short TTI is immediately performed using the method 1, while in the case of changing the short TTI to the long TTI, the change to the long TTI is performed after the data in error is retransmitted using the method 2.

Fourth Embodiment

Method 4 is a method of discarding all data remaining in the soft buffer and transmitting only the new data using the changed TTI if the TTI is changed during the HARQ operation.

According to the fourth embodiment of the present invention, the simplest and reliable TTI changing method is proposed although some data loss occurs. If the time point of TTI change is received by the signaling of the actual upper layer, the receiving part and the transmitting part change the TTI in consideration of the time point when the data frame ends and the time point when the transmission of the data frame through the ACK/NACK channel ends. In this case, a part of the HARQ processes would receive the data without error, i.e., a part of the HARQ processes would receive the ACK signal with respect to the transmitted data, according to the n-channel SAW system, and thus the HARQ process would be terminated. By contrast, the remaining HARQ processes would receive the NACK signal and thus require an additional retransmission.

However, in the fourth embodiment of the present invention, if the time point of TTI change is received through the signaling of the upper later, all the HARQ processes are terminated irrespective of the termination of the HARQ process. Then, the TTI changing procedure is completed by starting the initial transmission of the new data using the changed TTI.

As described above, the effect obtained by the representative of the present invention is as follows.

In a mobile communication system which uses the packet data service using an enhanced uplink channel and to which the HARQ technology is applied, the TTI change can be performed without deteriorating the performance of the HARQ by the proposed TTI changing method of the UE and the Node B in consideration of the HARQ operation at the time point of TTI change.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method of transmitting data by an User Equipment in a communication system, the method comprising the steps of:
   receiving, by the User Equipment, a Transmit Time Interval (TTI) change signal for requesting a TTI change through an upper signaling;
   comparing, by the User Equipment, a current TTI and a previous TTI in response to receiving the TTI change signal;
   determining a future TTI for changing the current TTI;
   changing, by the User Equipment, the current TTI at a time point of a first TTI change when the TTI change signal is received, according to a first TTI change mode determined when the future TTI is shorter than the previous TTI;
   changing, by the User Equipment, the current TTI at a time point of a second TTI change calculated by the TTI change signal and a completion time point of a Hybrid Automatic Repeat Request (HARQ) process in the previous TTI, according to a second TTI change mode determined when the future TTI is longer than the previous TTI; and
   transmitting data using new HARQ processes according to a changed TTI at the time point of one of the first TTI change and the second TTI change.

2. The method as claimed in claim 1, wherein the step of changing the current TTI according to the first TTI change mode comprises the substeps of:
   changing the current TTI at a time point indicated by the TTI change signal, and
   setting the new HARQ processes according to the changed TTI; and
   retransmitting the data using at least one of the new HARQ processes upon a reception of an acknowledge/negative acknowledge (ACK/NACK) signal according to the changed TTI, and transmitting new data using other HARQ processes according to the changed TTI.

3. The method as claimed in claim 2, wherein the retransmitting step comprises the substeps of:
   confirming IDs of previous HARQ processes used according to the previous TTI, and confirming the ACK/NACK signal from the previous HARQ processes having process IDs smaller or equal to the number of the new HARQ processes according to the changed TTI;
   determining whether the confirmed ACK/NACK signal is an ACK response; and
   if the ACK/NACK signal is not received or the ACKYNACK signal is an NACK response, retransmitting the new data using the at least one of the new HARQ processes having the same ID with the previous HARQ process.

4. The method as claimed in claim 1, wherein the step of changing the current TTI according to the second TTI change mode comprises the substep of performing the HARQ process according to the previous TTI until the second TTI change time reaches, and transmitting the data using the new HARQ processes according to the changed TTI at the time point of the second TTI change.

5. The method as claimed in claim 1, wherein the time point of the second TTI change is calculated based on a number of the previous HARQ processes and a predetermined maximum number of retransmission times.

6. The method as claimed in claim 1, wherein the step of changing the current TTI according to the second TTI change mode comprises the substep of performing a previous HARQ process before the second TTI change time arrives, and transmitting the data by setting the HARQ processes of the changed TTI at the time point of the second TTI change.

7. The method as claimed in claim 6, wherein the time point of the second TTI change is calculated based on a number of previous HARQ processes and a predetermined maximum number of retransmission times.

8. The method as claimed in claim 6, further comprising the step of reserving the step of transmitting the data until the second TTI change time arrives after the first TTI change time, and performing a retransmission process of the previous HARQ process.

9. An apparatus for transmitting data by an User Equipment in a communication system, the apparatus comprising:
a soft buffer for storing data to be transmitted;
a control unit for controlling Hybrid Automatic Repeat Request (HARQ) processes after receiving a Transmit Time Interval (TTI) change signal for requesting a TTI change through an upper signaling, so as to compare a current TTI and a previous TTI in response to receiving the TTI change signal, and for determining a future TTI for changing the current TTI, and then one of changing the current TTI at a time point when a TTI change signal is received according to a first TTI change mode determined when the future TTI is shorter than the previous TTI, or changing the current TTI at a time point of a second TTI change calculated by the received TTI change signal and a completion time point of a HARQ process in the previous TTI according to a second TTI changed mode determined when the future TTI is longer than the previous TTI; and
a HARQ unit for performing the HARQ process under the control of the control unit,
wherein the User Equipment transmits new data using new HARQ processes according to a changed TTI at the time point of one of the first TTI change and the second TTI change.

10. The apparatus as claimed in claim 9, wherein in the case of changing the current TTI according to the first TTI change mode, the HARQ control unit changes the current TTI at a time point indicated by the TTI change signal, sets the new HARQ processes according to the changed TTI, retransmits the data using at least one of the new HARQ processes upon a reception of an acknowledge/negative acknowledge (ACK/NACK) signal according to the changed TTI, and transmits the new data using other HARQ processes according to the changed TTI.

11. The apparatus as claimed in claim 10, wherein in the case of changing the current TTI according to the first TTI change mode, the HARQ control unit confirms IDs of previous HARQ processes used according to the previous TTI, confirms ACK/NACK signal from the previous HARQ processes having process IDs smaller or equal to the number of new HARQ processes according to the changed TTI, determines whether the confirmed ACK/NACK signal is an ACK response, and retransmits data using the new HARQ processes having at least one of the confirmed IDs of the previous HARQ processes when the ACK/NACK signal is not received or the ACK/NACK signal is an NACK response.

12. The apparatus as claimed in claim 9, wherein in the case of changing the current TTI according to the second TTI change mode, the HARQ control unit performs the HARQ process according to the previous TTI until the second TTI change time reaches, and transmits the new data using the new HARQ processes according to the changed TTI at the time point of the second TTI change.

13. The apparatus as claimed in claim 9, wherein the time point of the second TTI change is calculated based on a number of previous HARQ processes and a predetermined maximum number of retransmission times.

14. The apparatus as claimed in claim 9, wherein in the case of changing the current TTI according to the second TTI change mode, the HARQ control unit performs a previous HARQ process before the second TTI change time arrives, and transmits the new data by setting the new HARQ processes of the changed TTI at the time point of the second TTI change.

15. The apparatus as claimed in claim 14, wherein the time point of the second TTI change is calculated by considering a number of previous HARQ processes and a predetermined maximum number of retransmission times.

16. The apparatus as claimed in claim 14, wherein the HARQ control unit reserves transmitting the new data until the second TTI change time arrives after the first TTI change time, and performs a retransmission process of the previous HARQ process.

* * * * *